US012460430B1

(12) United States Patent
Green

(10) Patent No.: US 12,460,430 B1
(45) Date of Patent: Nov. 4, 2025

(54) DRYWALL COMPOUND APPLICATOR

(71) Applicant: Seamless Tools LLC, Millcreek, UT (US)

(72) Inventor: Richard Green, Millcreek, UT (US)

(73) Assignee: Seamless Tools LLC, Millcreek, UT (US)

( * ) Notice: Subject to any disclaimer, the term of this patent is extended or adjusted under 35 U.S.C. 154(b) by 0 days.

(21) Appl. No.: 18/746,545

(22) Filed: Jun. 18, 2024

(51) Int. Cl.
*E04F 21/08* (2006.01)
*B05C 17/01* (2006.01)

(52) U.S. Cl.
CPC .............. *E04F 21/08* (2013.01); *B05C 17/01* (2013.01)

(58) Field of Classification Search
CPC ......... E04F 21/026; E04F 21/06; E04F 21/08; E04F 21/165; E04F 21/1652
USPC .............................................................. 401/5
See application file for complete search history.

(56) References Cited

U.S. PATENT DOCUMENTS 2,809,513 A * 10/1957 Ames .................... B05C 17/005 401/48
3,888,611 A * 6/1975 Ames .................... B05C 17/005 401/48
5,099,539 A * 3/1992 Forester ..................... B25J 1/04 15/144.3
5,143,264 A * 9/1992 MacMillan ......... E04F 21/1652 401/5
7,628,295 B2 12/2009 Mondloch et al.
8,231,371 B1 * 7/2012 Jalbert ................ E04F 21/1652 118/200
9,481,009 B2 11/2016 Evans
D884,359 S 5/2020 Green
2017/0100740 A1 4/2017 Pentland
2018/0087281 A1 3/2018 Murray

* cited by examiner

*Primary Examiner* — David P Angwin
*Assistant Examiner* — Bradley S Oliver
(74) *Attorney, Agent, or Firm* — PATENT LAW WORKS LLP

(57) ABSTRACT

The disclosure provides an applicator for applying drywall compound. The applicator includes a front panel, a first side panel, a second side panel, a back panel, a lid, and a back bridge. The applicator is adapted to change configurations between a flat configuration and a box configuration. When the applicator is in the box configuration, the lid secures the first side panel to the second side panel and the back bridge secures the first side panel to the second side panel. The back panel articulates to push the compound out of the box. A seal prevents the compound from leaking past the back panel. The compound is directed by the lid out the front of the box, and a scraper distributes the compound on the drywall. The back panel includes a shaft attachment assembly, which limits the angle of the shaft relative to the back panel.

18 Claims, 17 Drawing Sheets

DRYWALL COMPOUND APPLICATOR

TECHNICAL FIELD

The invention relates to devices for applying drywall compound to seal the edges of drywall.

BACKGROUND

Drywall installation typically involves joining two or more panels or sheets of gypsum board together to create a larger surface, such as a wall or ceiling. This is accomplished by taping the joints and covering the tape with joint compound (or "mud"). Additional applications of mud can be used depending on the specified level of surface finish. Some drywall finishers prefer to apply the mud by hand using drywall knives, but this can be a time-consuming process. To semi-automate the process, tool manufacturers have created "flat boxes" comprising reservoirs attached to handles for guiding along gypsum board or drywall joints. The flat boxes apply joint compound, normally over a strip of joint tape, along joints. The joint compound can be sanded and re-coated as necessary to achieve the specified finish level. There are also corner tools and associated reservoirs that apply mud to corner joints. The user applies pressure via a handle assembly to dispense the mud while pushing or pulling such applicators along the drywall joints.

SUMMARY

In a first aspect, the disclosure provides an applicator for applying drywall compound. The applicator includes a front panel, a first side panel, a second side panel, a back panel, a lid, and a back bridge. The front panel, the first side panel, the second side panel, and the back panel are adapted to change configurations between a flat configuration and a box configuration. When the front panel, the first side panel, the second side panel, and the back panel are in the box configuration, the lid secures the first side panel to the second side panel and the back bridge secures the first side panel to the second side panel. When the front panel, the first side panel, the second side panel, and the back panel are in the box configuration, the back panel articulates to change the volume of the box and push the compound out of the box. The back panel comprises a seal which prevents the compound from leaking past the back panel, as the compound is pushed out of the box. The lid includes a scraper, and as the compound is pushed out of the box, the compound is directed by the lid out the front of the box, and the scraper distributes the compound on the drywall. The back panel includes a shaft attachment hinge, and the shaft attachment hinge limits the angle of the shaft relative to the back panel.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
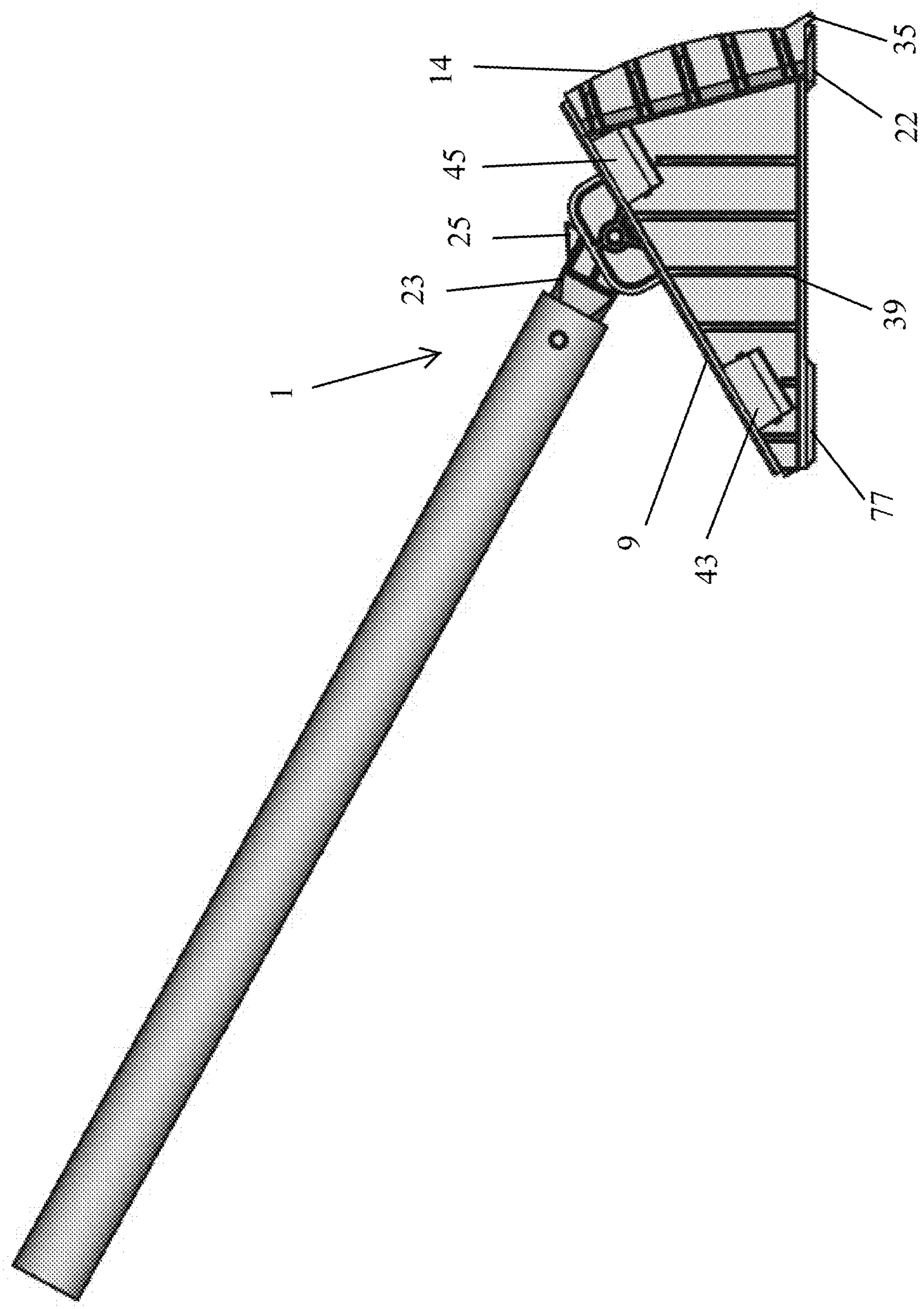
FIG. 1 is a side view of a drywall applicator.
Figure 2:
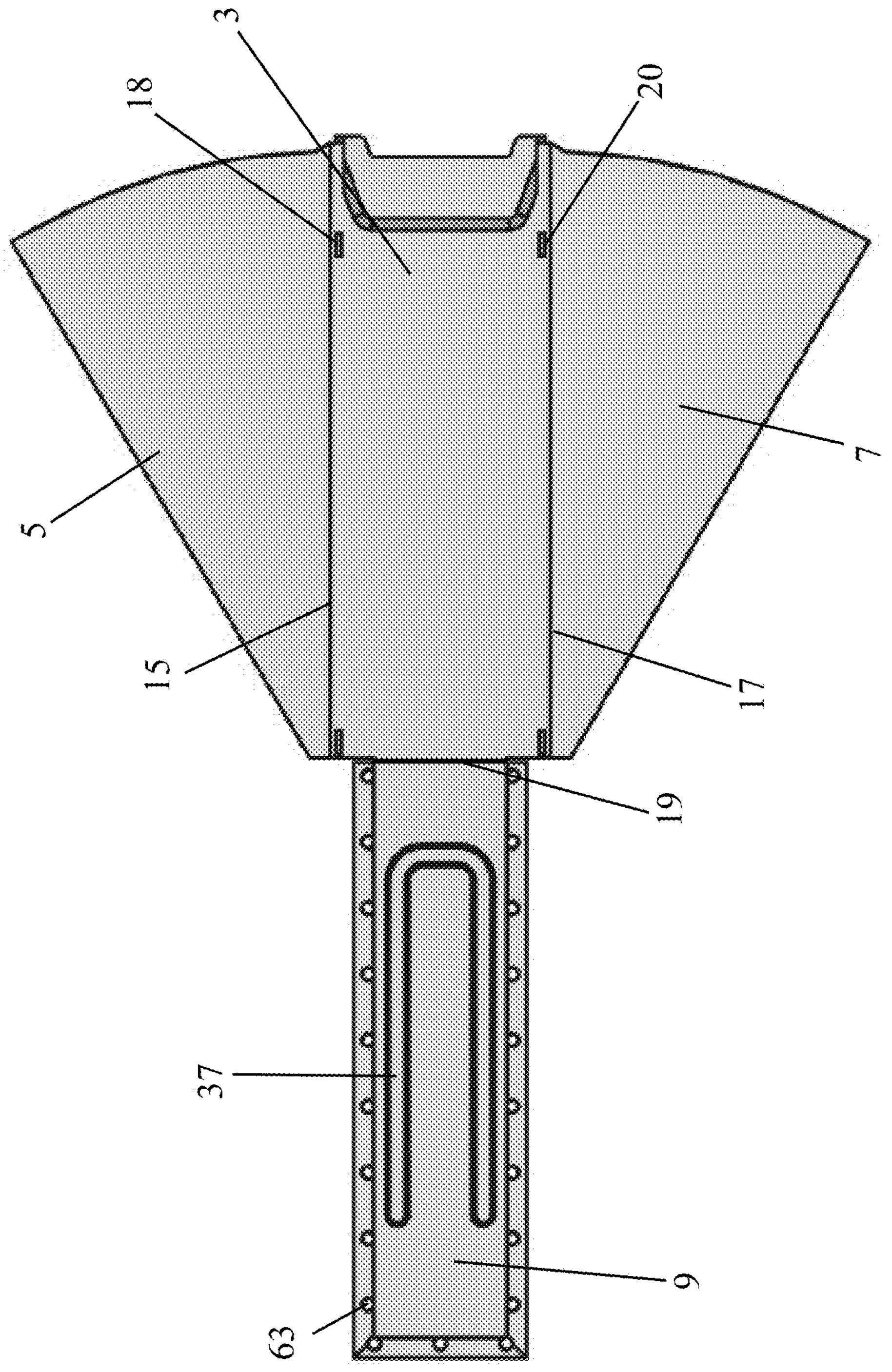
FIG. 2 is a view of the inside surfaces of the box of the applicator, with the one-piece box being laid flat.
Figure 3:
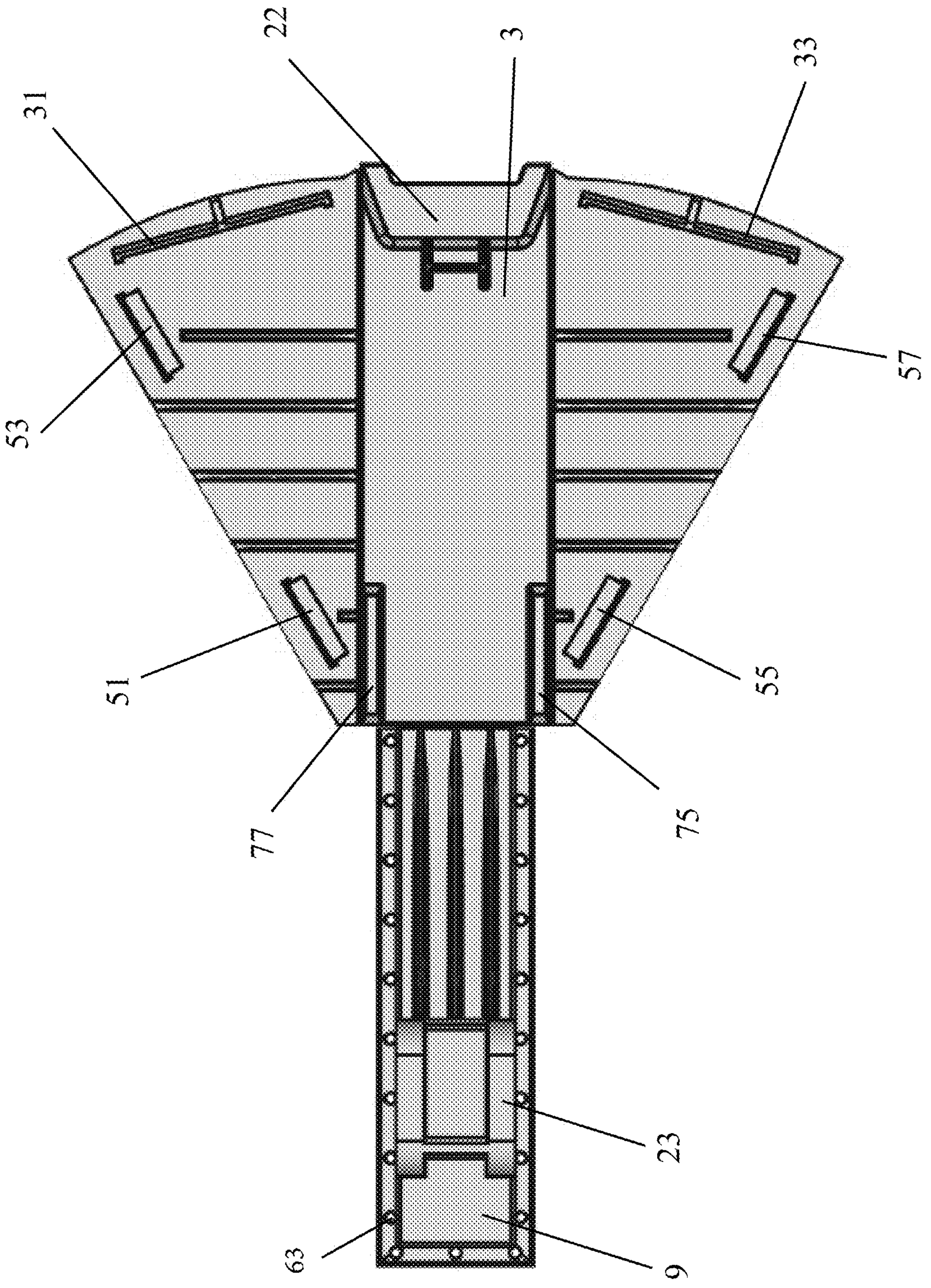
FIG. 3 is a bottom view of the box of the applicator, laid flat.
Figure 4:
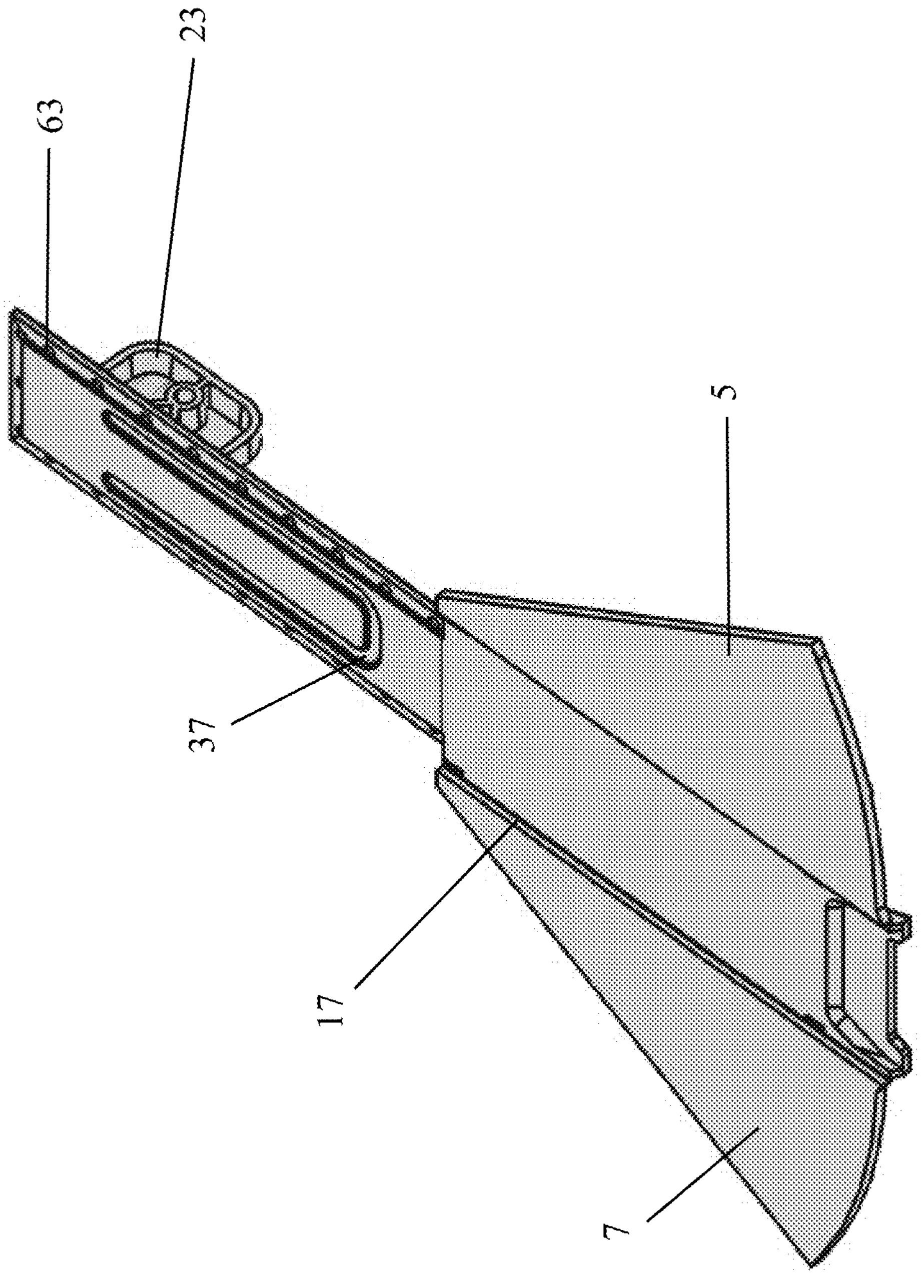
FIG. 4 is a perspective view of the inside surfaces of box of the applicator, laid flat.
Figure 5:
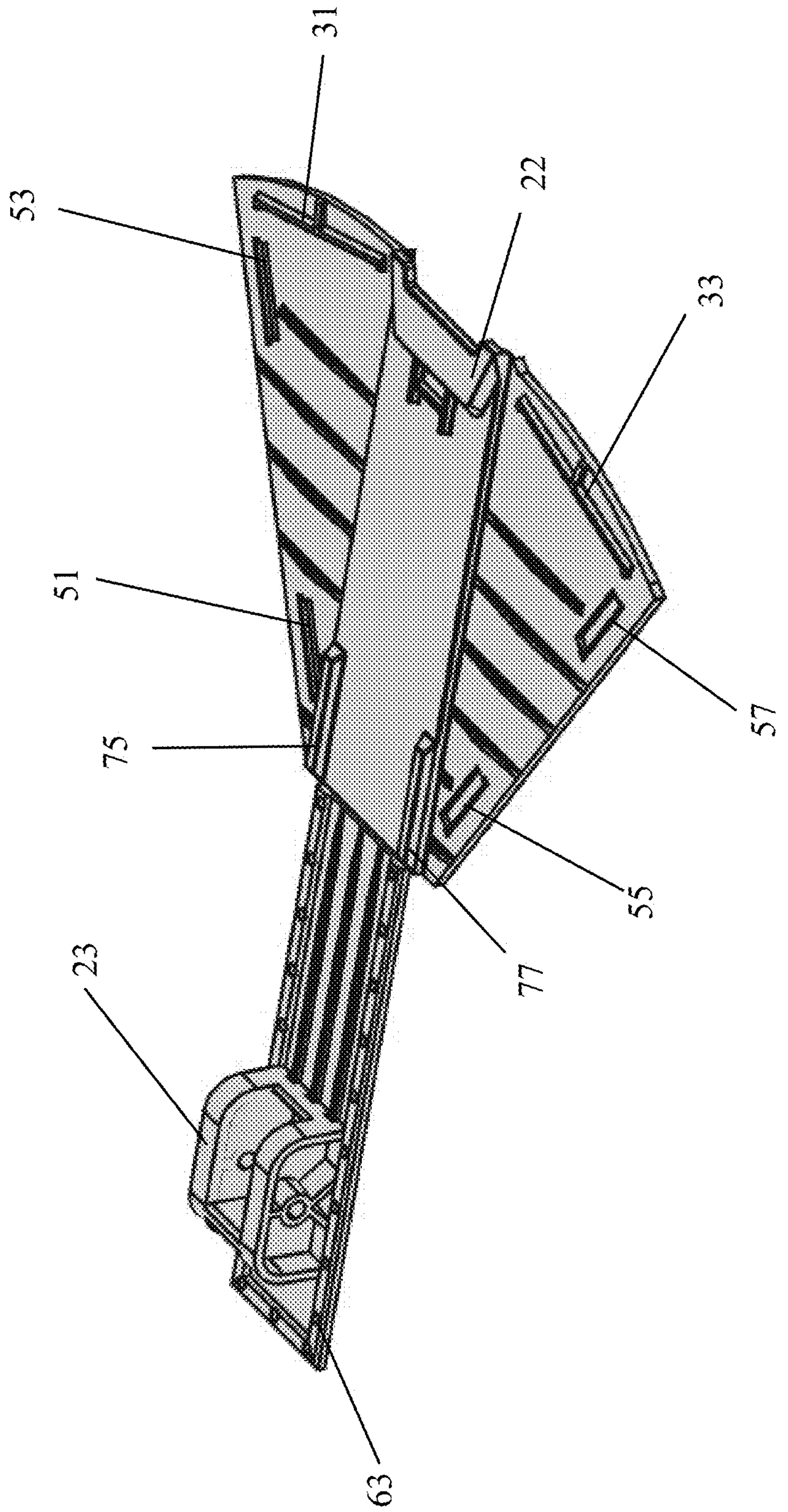
FIG. 5 is a perspective view of the bottom of the box of the applicator, laid flat.
Figure 6:
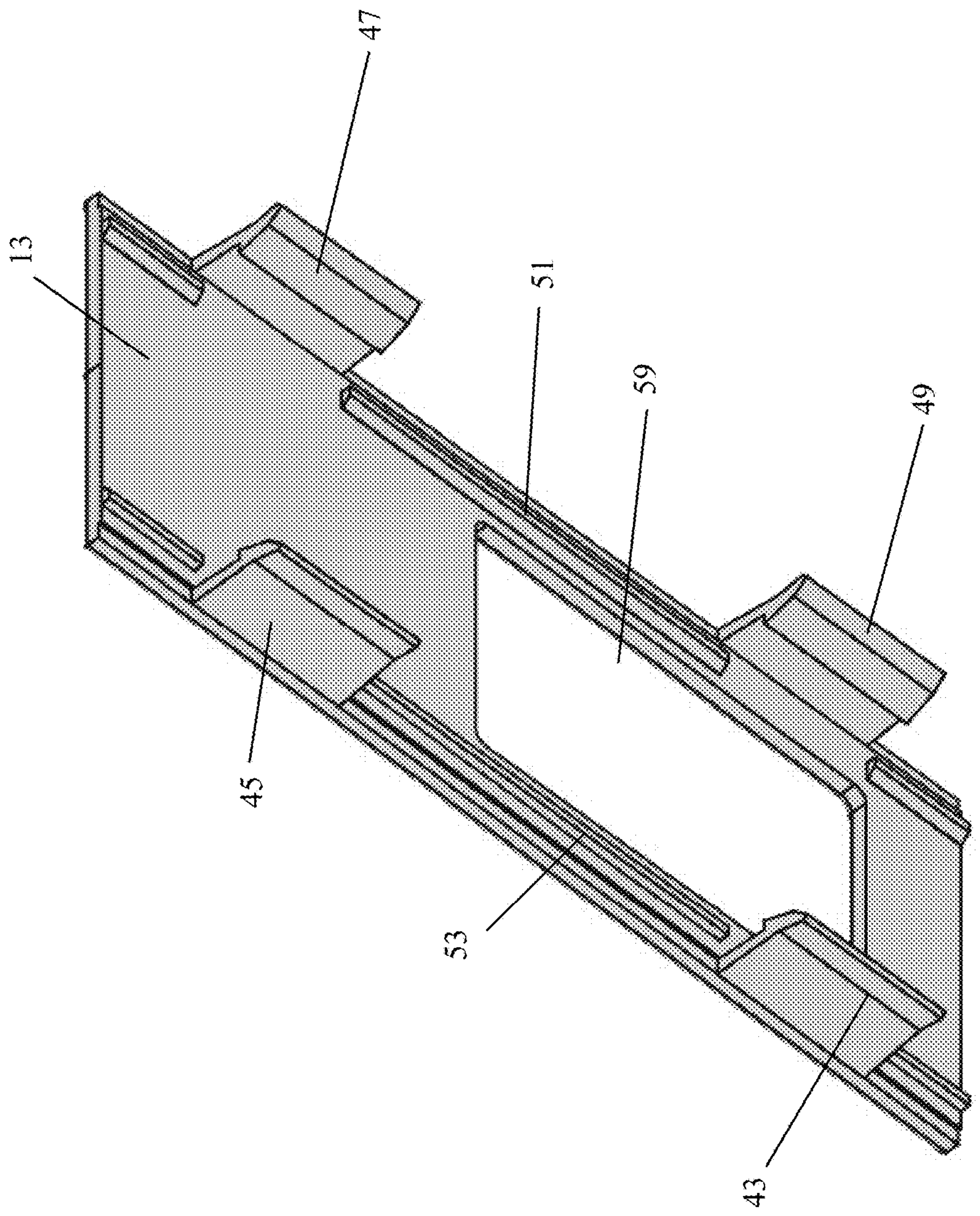
FIG. 6 is a perspective view of the back bridge of the applicator.
Figure 7:
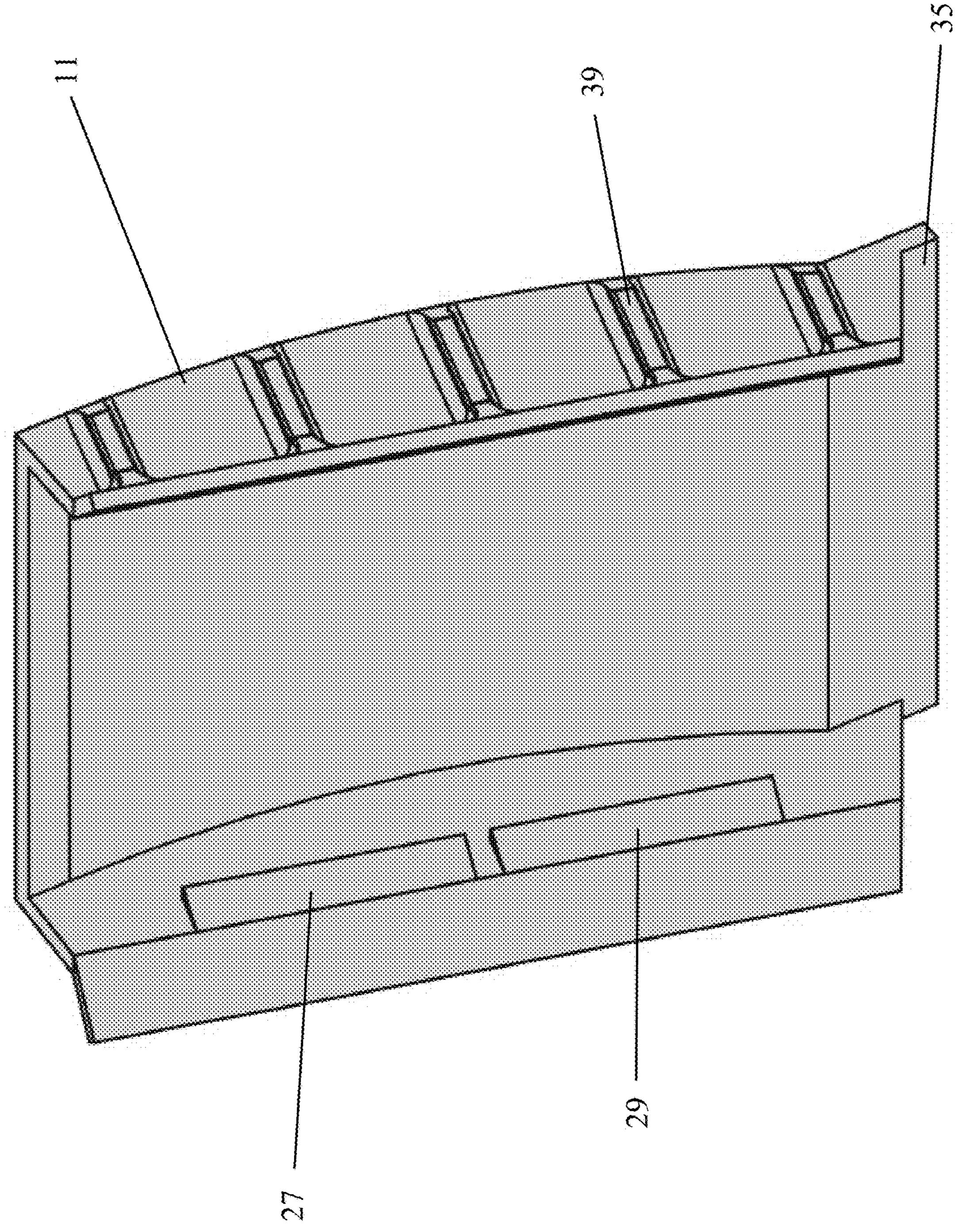
FIG. 7 is a perspective view of the lid of the applicator.
Figure 8:
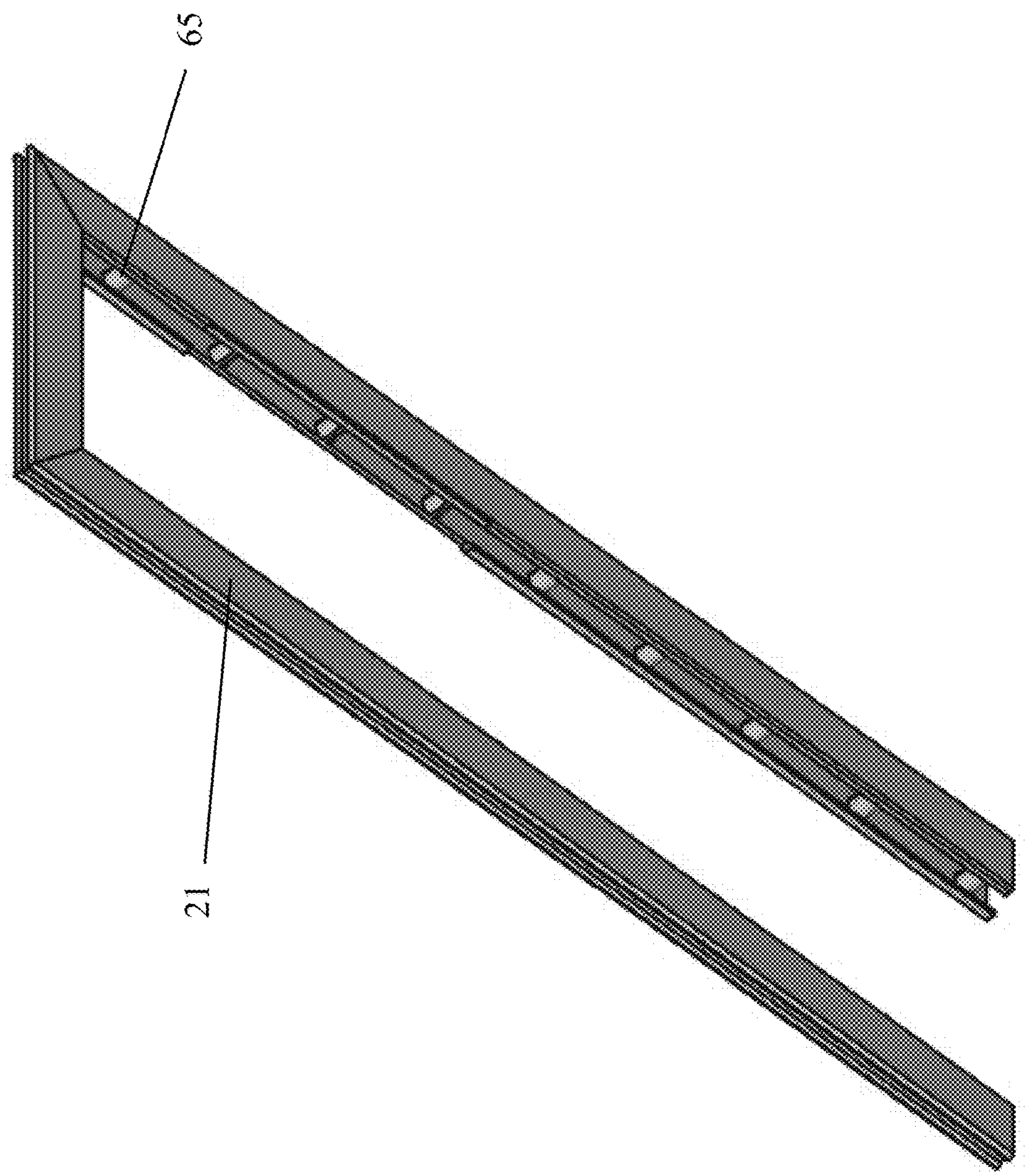
FIG. 8 is a view of the seal for the rear panel.
Figure 9:
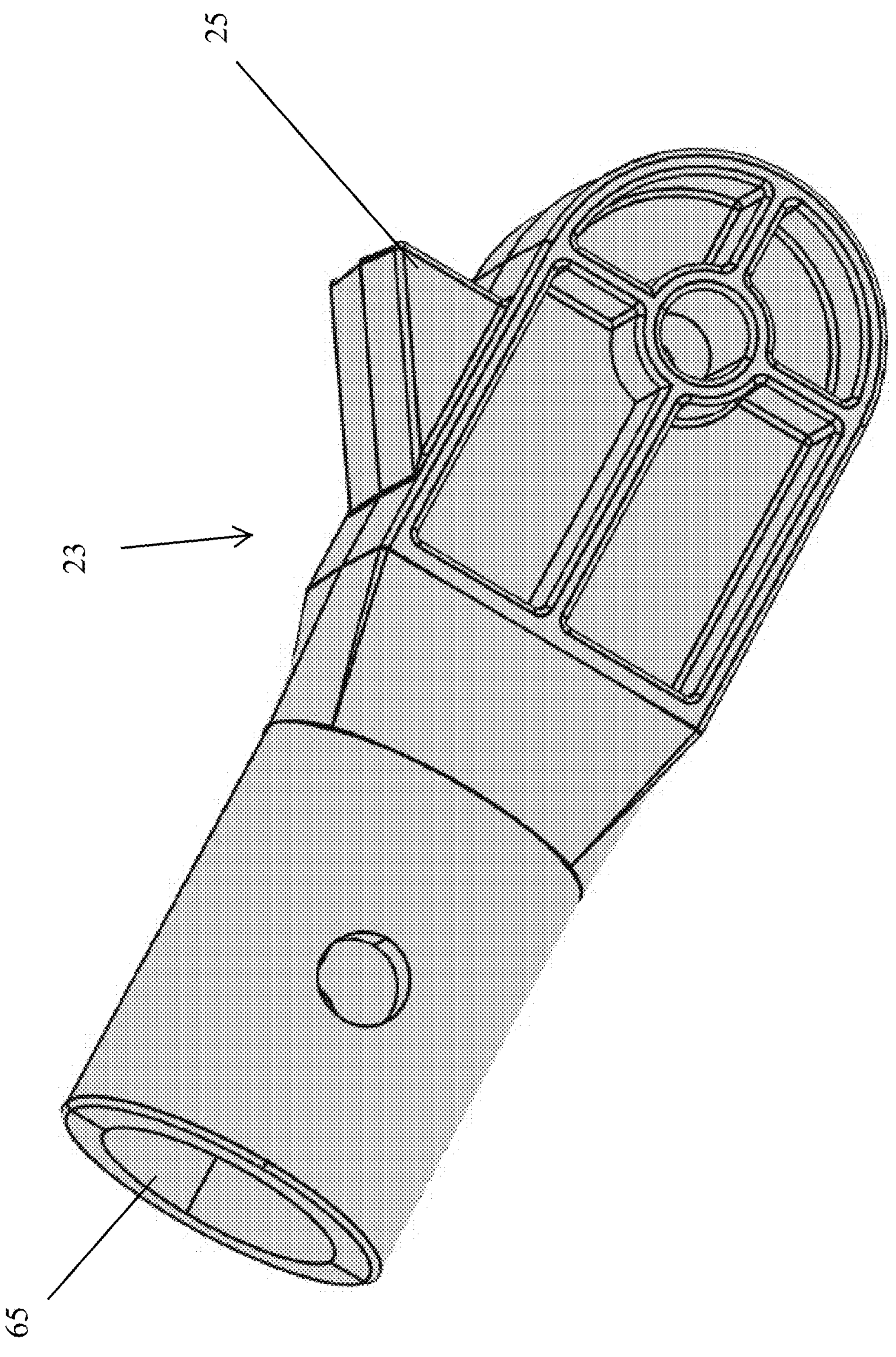
FIG. 9 is view of the handle attachment assembly.
Figure 10:
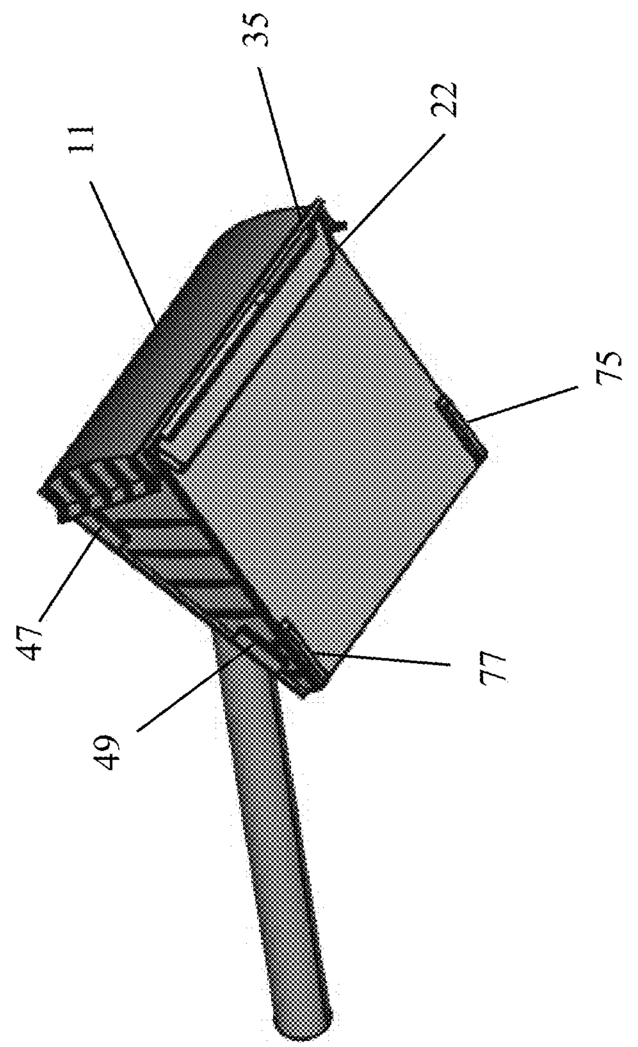
FIG. 10 is a bottom view of the applicator.
Figure 11:
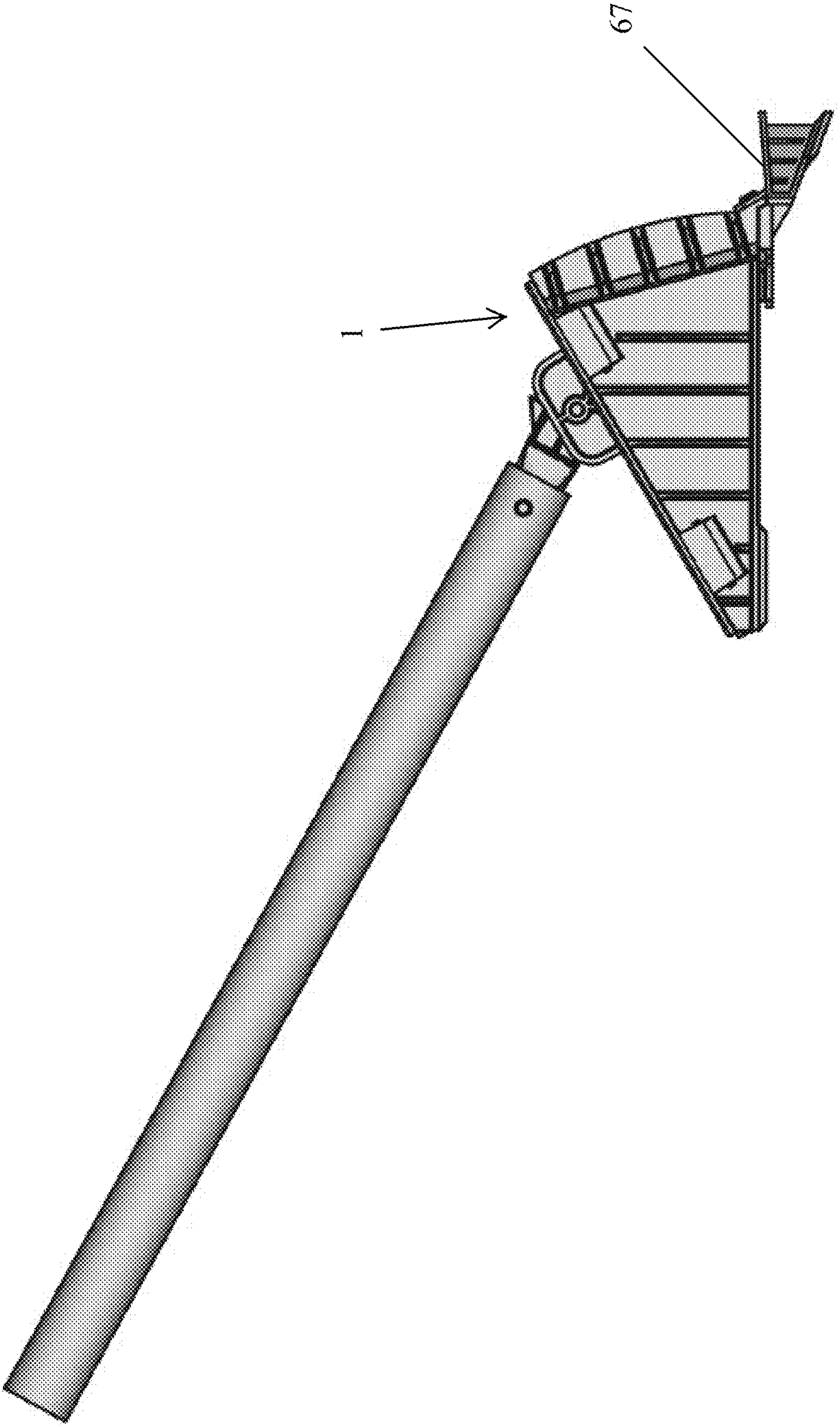
FIG. 11 is a side view of the drywall compound applicator with a corner attachment secured to the drywall compound applicator.
Figure 12:
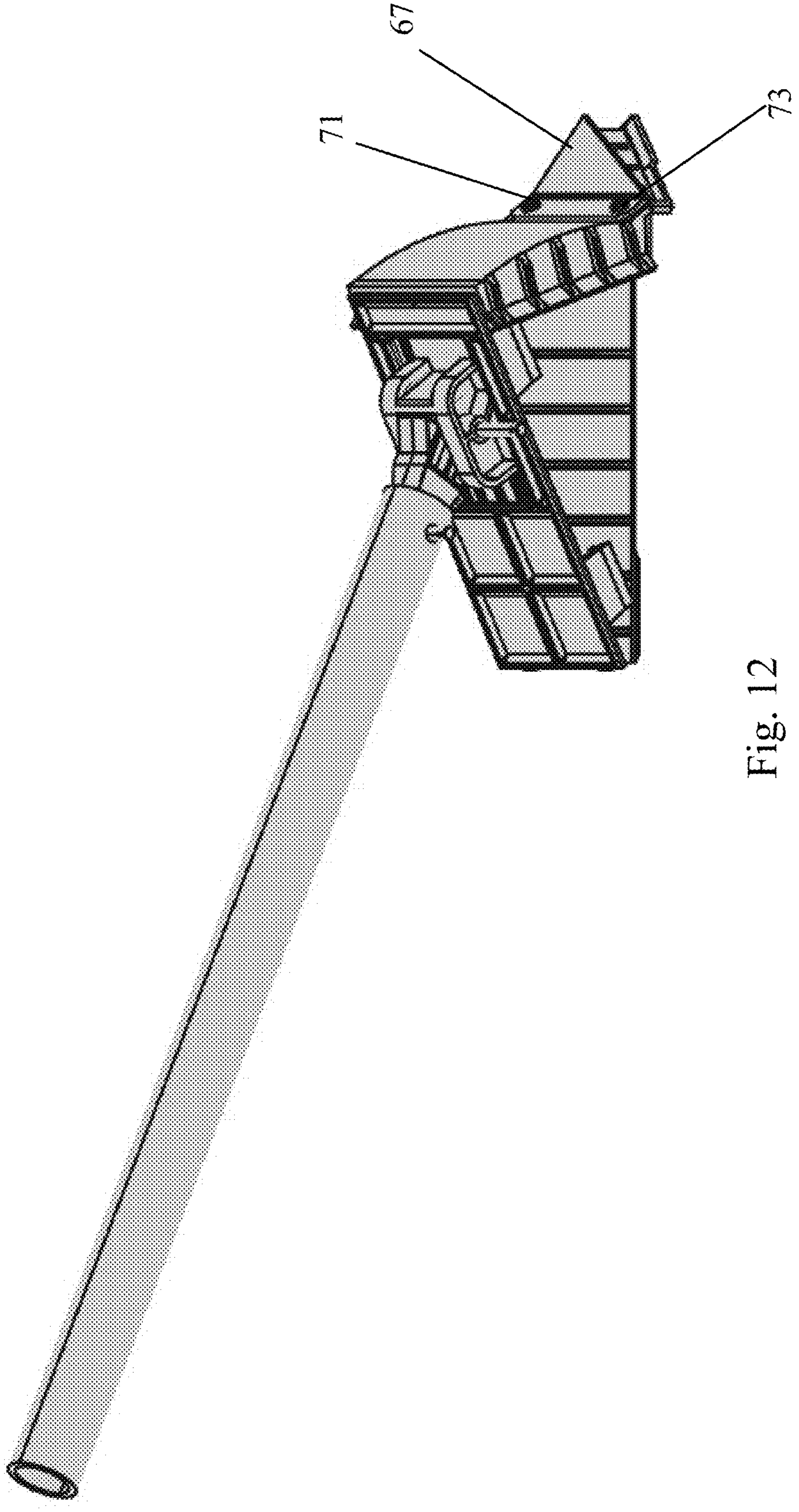
FIG. 12 is a top perspective view of the applicator with a corner attachment secured on the applicator.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein "drywall compound" also known as drywall mud or joint compound, is meant to refer to a mixture that secures drywall tape, seals the joints between drywall panels, and covers up nail and screw heads to give a wall a seamless look. Typically, drywall compounds are gypsum-based.

Traditionally, when applying drywall compound to a wall, the compound is held in an open container and a drywall knife is used to apply and spread the drywall compound on the wall. This requires that the person applying the drywall compound hold the open container in one hand and the drywall knife in the other, or that the person applying the drywall compound stays near an object on which the open container is placed.

This disclosure describes an applicator which holds and distributes the drywall compound.

The applicator is a box which holds the drywall compound and compresses to squeeze the drywall compound out of the box to be spread on the wall. The box includes a shaft attachment assembly. The shaft attachment assembly articulates to enable adjustment of the angle of the shaft as the applicator is moved along a wall. As the applicator is slid along a wall, the rear wall is pushed which pushes drywall compound out of the top of the applicator. As the compound is pushed out of the top of the applicator, the compound is directed toward the wall by the lid. The edge of the lid directed toward the wall acts as a scraper to distribute the drywall compound across the wall.

In some implementations, the box of the applicator is formed from a front panel 3, a first side panel 5, a second side panel 7, and a rear panel 9. A lid 11 secures the first side panel 5 to the second side panel 7, and acts as a lid for the box. A back bridge 13 secures the first side panel 5 to the second side panel 7. The lid 11 and the back bridge 13 provide stability to the box. The lid 11 and the back bridge 13 are substantially rigid. In some implementations, the panels that form the box are constructed from a single piece. In some of these implementations, the first side panel 5, the second side panel 7, and the rear panel 9 are connected by living hinges 15, 17, 19 to the first panel 3. To form the box, the front panel 3 may be laid flat. The first side panel 5 and the second side panel 7 are positioned substantially perpendicular to the front panel 3, and the lid 11 is attached to the first panel 5 and the second panel 7. The back bridge 11 is then attached to the first side panel 5 and to the second side panel 7. The front panel 3 and rear panel 9 are substantially rectangular in shape, while the first side panel 5 and the second side panel 7 are substantially triangular in shape. The triangular shape of the side panels may be scalene, isosceles, obtuse, or right triangular shapes. The hinge 19 connecting the front panel and the rear panel corresponds to the smallest angle of the triangles of the first side panel 5 and the second side panel 7. The hinge 19 between the front panel and the rear panel also forms the bottom of the box. Securing the first side panel 5 to the second side panel 7, without securing either side panel to the rear panel 9 enables the rear panel 9 to articulate relative to the front panel 3. As the rear panel 9 articulates toward the front panel 3 the smallest angle of the triangle decreases and the volume of the box decreases. This pushes any drywall compound in the box away from the bottom of the box causing the drywall compound to move out the top of the box.

The applicator box which includes the front panel, the rear panel, the first side panel, and the second side panel is formed from a material that is strong, yet includes flexible portions. In some implementations, the applicator box is injection molded. In some implementations the injection molding is a plastic. In some of these implementations, the plastic is one of a thermoplastic, a reinforced plastic, or a composite. In some implementations, the applicator box is 3D printed.

To keep the drywall compound from spurting past the rear panel, as the rear panel is articulated toward the front panel, the rear panel includes seals 21. The seals 21 form a barrier so that the drywall compound cannot get around the rear panel. In some implementations, the seals 21 fit around the rear panel 9. In some implementations, the seals are formed with the rear panel 9 and holes in the rear panel 9 allow the seal to be formed in such a way that the seal will not be easily removed from the rear panel. In forming the seals, posts, such as post 65, are created which fill the holes, such as hole 63, in the back panel. These posts, such as post 65, connect the portions of the seals that wrap around the back panel. The posts prevent the seals from disengaging from the rear panel. Additionally, in some implementations, the rear panel includes plunge stops on the inner surface to stop the rear panel 9 from completely meeting front panel 3. These plunge stops 18 and 20 help to prevent too much pressure from being applied to the hinge 19 between the front panel and the rear panel.

The rear panel 9 includes a handle attachment assembly 23. The handle attachment assembly 23 allows the attachment of a handle so the applicator may be used to reach places that would be out of reach without the use of the handle. The handle attachment assembly 23 articulates so the front of the applicator will remain flat against a wall as the applicator is slid against a wall. The handle attachment assembly 23 will change angles so that the front of the applicator is not pulled away from a wall and the drywall compound is then not distributed evenly. In some implementations, the handle attachment assembly 23 includes angle limiter 25 to keep the handle in a comfortable level of articulation. The articulation of the handle also allows consistent pressure to be exerted on the rear panel to provide a consistent release of drywall compound out of the applicator. In some implementations, the angle limiter limits the angle of the handle to between about 40 degrees and about 90 degrees. In some implementations, the angle limiter limits the angle of the handle to between about 50 degrees and about 70 degrees. In some implementations, the angle limiter limits the angle of the handle to about 60 degrees. The handle attachment assembly includes a handle insertion aperture 65 into which a handle is inserted and secured.

The front panel includes glides 73 and 75 and distribution mouth 77. The distribution mouth assists in containing the distribution of the drywall compound. The rear panel presses the drywall compound out of the box and the distribution mouth collects a measured amount to distribute to assist in accurately applying the drywall compound. The distribution mouth descends below the outer plane of the front panel and in conjunction with the glides, enables the applicator to glide along the surface which is receiving the drywall compound.

The panels of the drywall compound applicator need to be strong enough to hold up to the pressure of the drywall compound being pushed out of the box of the applicator. The various panels include strengthening and stiffening elements to ensure that the box will hold up to the forces exerted on them by the drywall compound being pushed out of the box. The strengthening elements include stiffening ribs. In some implementations, the stiffening ribs are molded into the panels and appear as troughs or indented lines below the surface of the panels. In some implementations, the stiffening ribs are molded onto the ribs and appear as raised bars or lines on top of the surface of the panels. In some implementations, the side panels include raised stiffening ribs such as stiffening rib 39. The stiffening elements may be separate structures that are added to at least one side of a panel. In some embodiments, the strengthening elements include a stiffening rib on the back panel 37. In some implementations, the stiffening rib is U-shaped. A U-shaped stiffening rib will add stiffness to the rear panel in multiple directions. In some implementations, the stiffening rib is multiple stiffening ribs running parallel to the side panels. In some implementations, the stiffening rib is multiple ribs running perpendicular to the side panels. The side panels also include stiffening elements. In some implementations, the stiffening elements are ribs which run perpendicular to the hinge connecting the side panels to the rear panel.

The lid and back bridge hold the applicator together. The lid 11 fits onto the side the panels. The lid and side panels are secured together with snap locks. Each snap lock includes a hook such as lock hooks 27 and 29 which insert into lock shelf 31. In some implementations, the lock shelves 31 and 33 are recessed into the first side panel 5 or in the second side panel 7. In implementations utilizing recessed lock shelves, the recessed lock shelves are reinforced. In some implementations the lock shelves 31 and 33 protrude from the first side panel or the second side panel. The lock shelves and the lock hooks snap together to hold the lid onto each side panel. The lid 11 directs the drywall compound out of the applicator 1. As the drywall compound is directed out of the applicator a scraper 35 smooths the drywall compound. The scraper 35 enables the drywall compound to be applied in a uniform manner. In some implementations, the lid includes stiffening ribs such as stiffening rib 41.

The back bridge 13 also attaches to the first side panel 5 and to the second side panel 7. The back bridge 13 adds stiffness and support to the applicator. The back bridge attaches to the side panels with snap locks. Each snap lock includes a hook lock on the back bridge and lock selves on the side panels. Hook locks 43, 45, 47, and 49 snap together with lock shelves 51, 53, 55, and 57. In some implementations, the lock shelves 51, 53, 55, and 57 are recessed into the first side panel 5 or in the second side panel 7. In some implementations the lock shelves 51, 53, 55, and 57 protrude from the first side panel or the second side panel. The hook locks 43, 45, 47, and 49 work in conjunction with the support beams 59 and 61 to hold the side panels firmly in place. The side panels fit between the hook locks and the support beams. The support beams keep the side panels from folding inward and provide resistance for the hook locks to securely connect to the lock shelves. The back bridge also includes an aperture 59, through which the handle assembly attachment fits. This enables the back bridge to provide support for the applicator and enables the back panel to articulate to press the drywall compound out.

In some implementations, the lid acts as a scraper to spread the drywall compound. In implementations where the applicator sits flush against the wall, the scraper is flat. A flat scraper distributes the drywall compound in a flat layer. While the drywall compound is flattened by the scraper, the drywall compound does not adhere flush to the wall on which it is applied. In some instances, it is necessary to apply an additional coat or multiple additional coats.

The applicator and box of the applicator are used in the application of drywall compound. In some implementations, it is desirable to have a box that is wide enough to cover the seams between panels of drywall, and the tape that is used over those seams. In some of these implementations, the drywall applicator is between about 6 inches and about 18 inches wide. In some implementations the drywall applicator is about 8 inches wide. In some implementations, the drywall compound applicator is about 12 inches wide. In some implementations, it is desirable to fit the applicator into smaller spaces or to apply drywall compound to seams without tape. In some of these implementations, the drywall applicator is between about 2 inches and about 6 inches wide. In some implementations, the drywall applicator is about 3 inches wide.

The method for the use of the applicator is as follows. An applicator box is placed on a level surface, the one-piece applicator box will lay flat. The rear panel, first side panel, and second side panel are lifted into position. The living hinges between the panels, enable panels to be raised into position, and form the edges of the applicator box. The back bridge is then attached to the side panels. Once the back bridge is attached the box is filled with drywall compound. After filling the applicator box with drywall compound, the lid is attached. The applicator is then positioned against a wall and the back panel is pushed down to force the drywall compound out of the box. As the applicator slides against the wall, the glides and the scoop create less friction to more easily slide the applicator across the wall. The scraper of the lid smooths out the drywall compound. In embodiments with an attachment, such as a corner attachment, the attachment smooths out the drywall compound.

Figure 13:
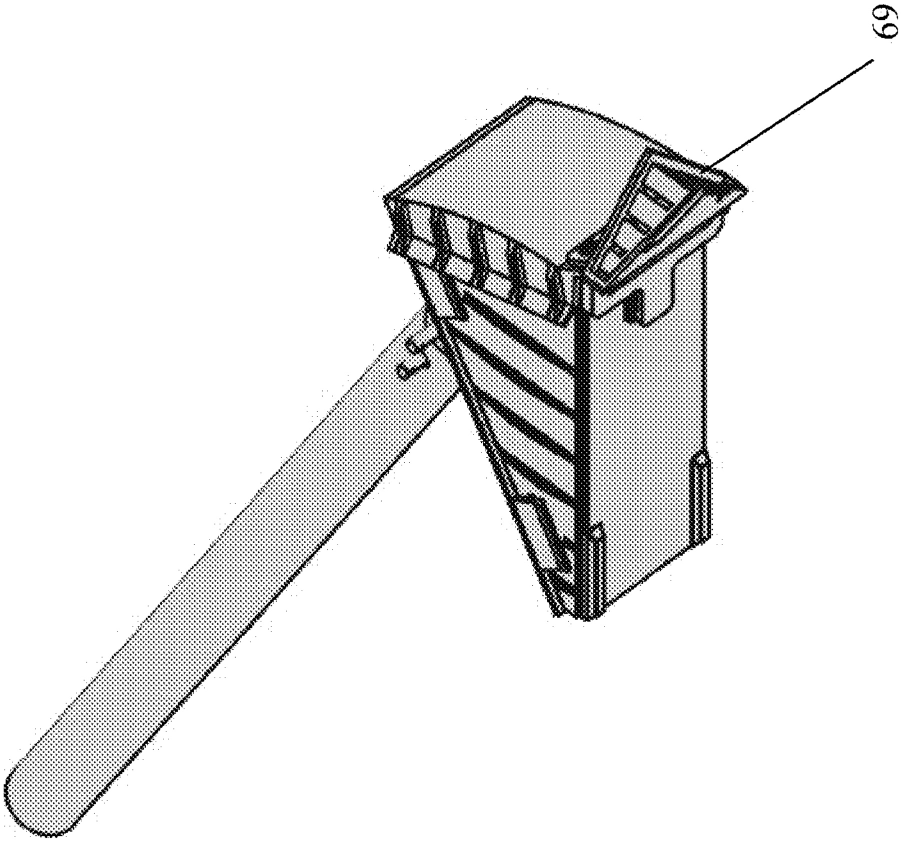
FIG. 13 is a front perspective view of the applicator with a corner attachment secured on the applicator.
Figure 14:
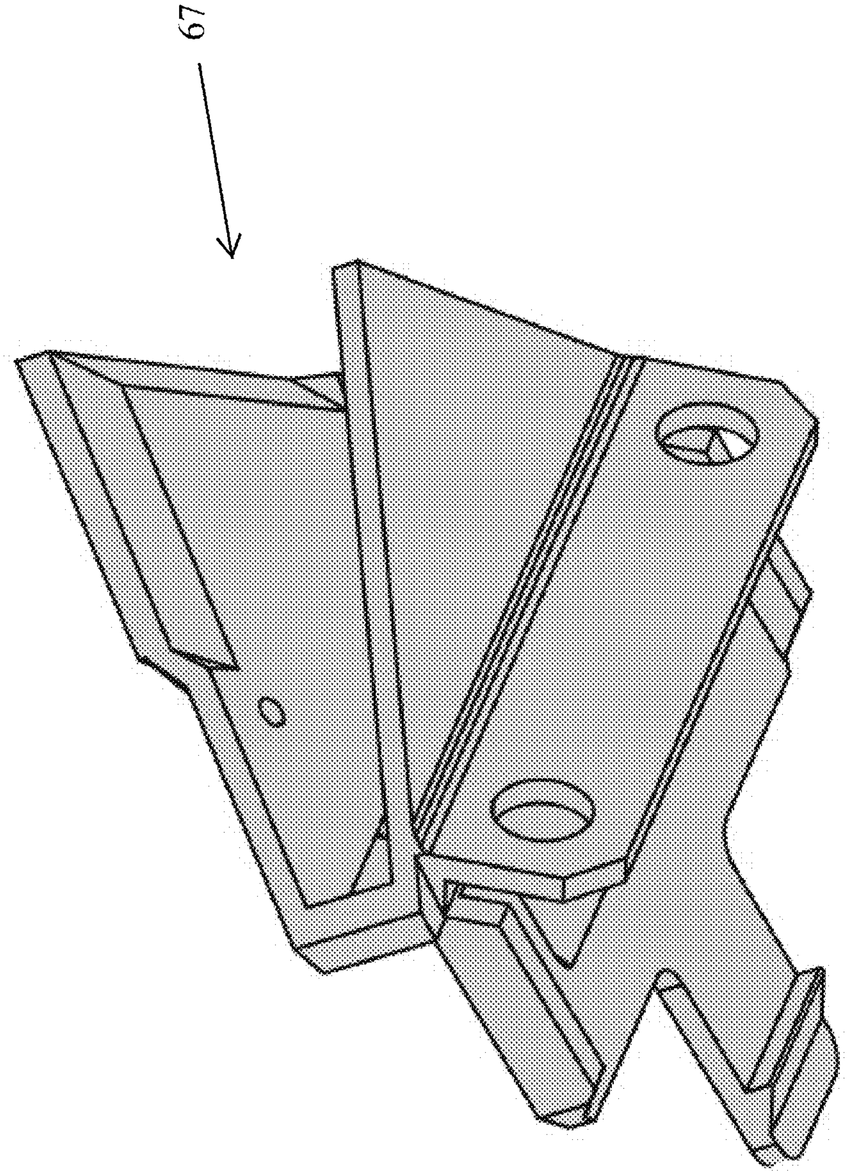
FIG. 14 is a perspective view of the corner scraper attachment.
Figure 15:
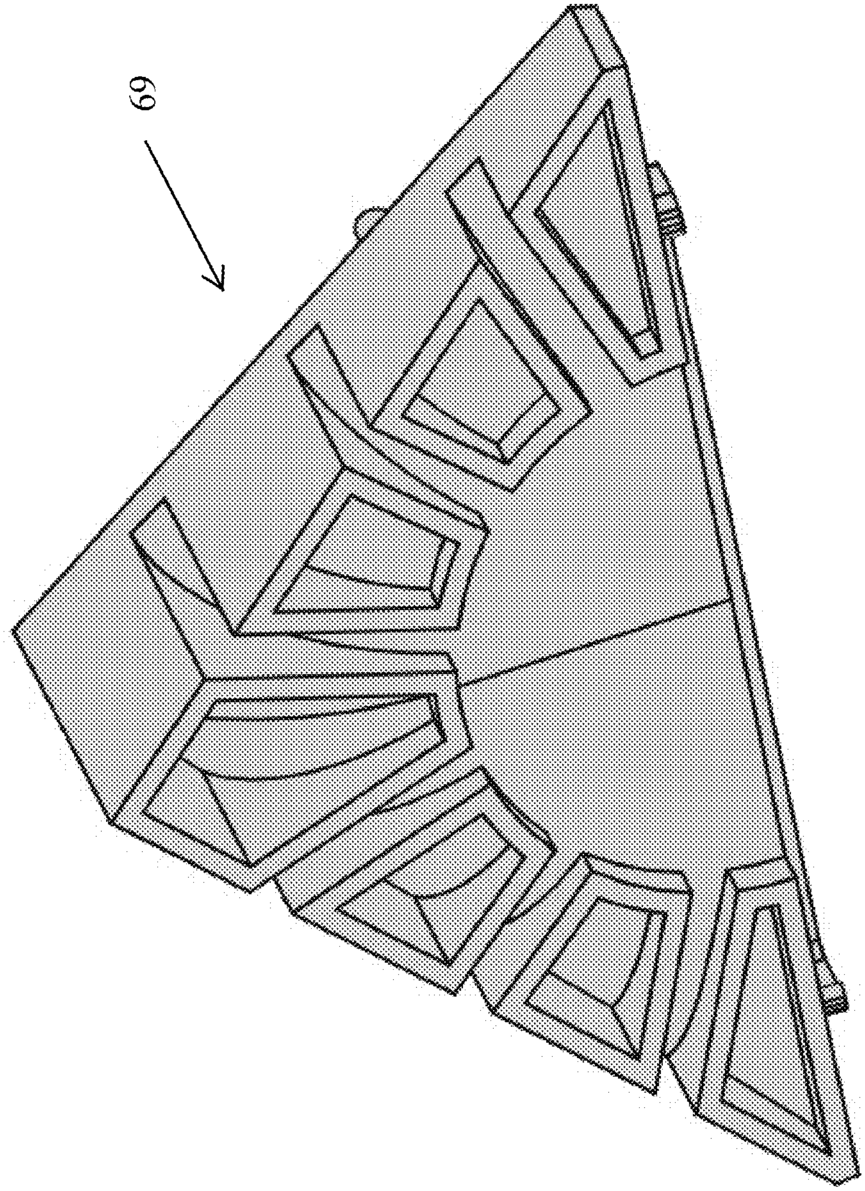
FIG. 15 is a perspective view of the corner diffuser attachment.
Figure 16:
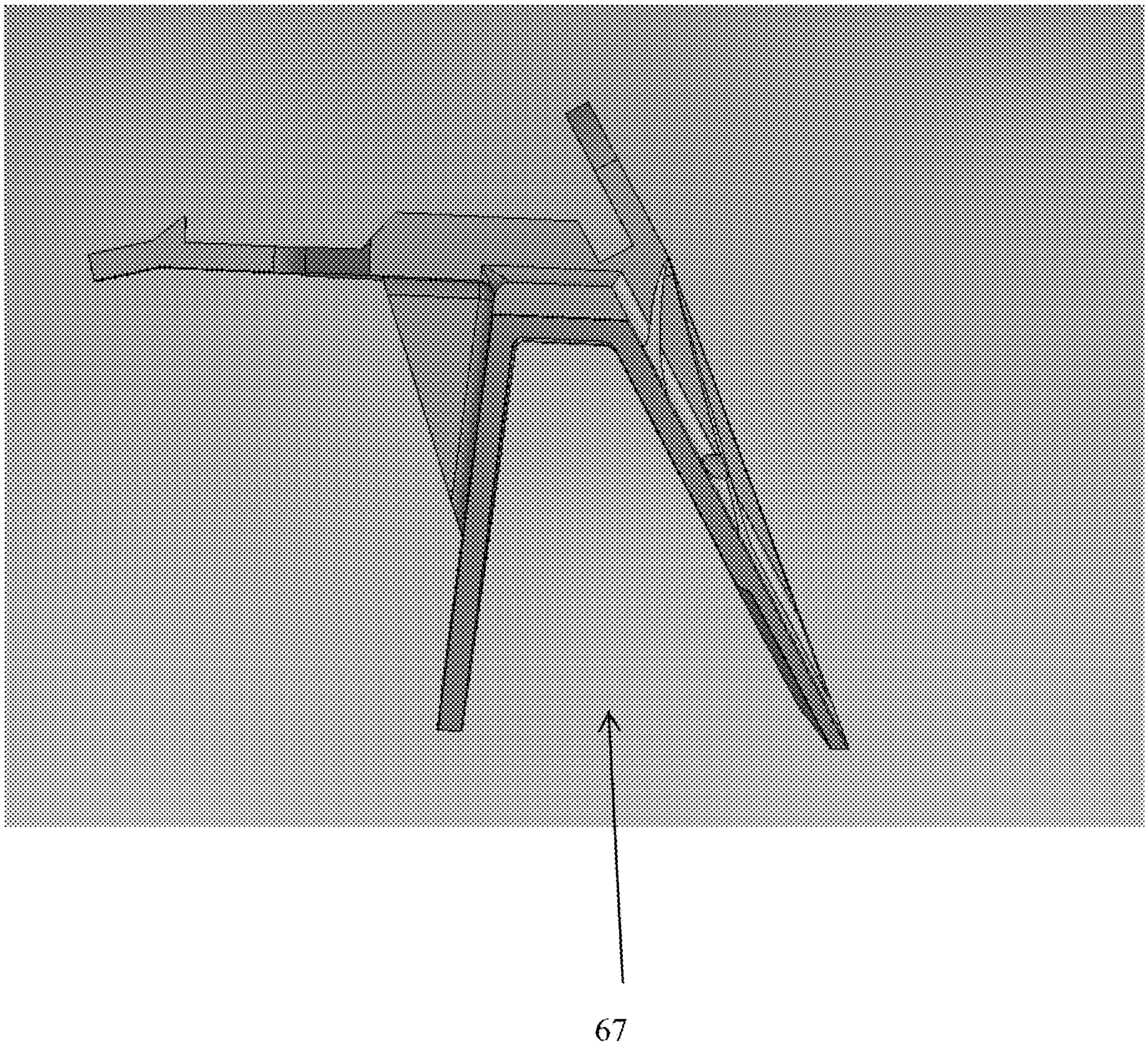
FIG. 16 is a side view of a corner scraper attachment.
Figure 17:
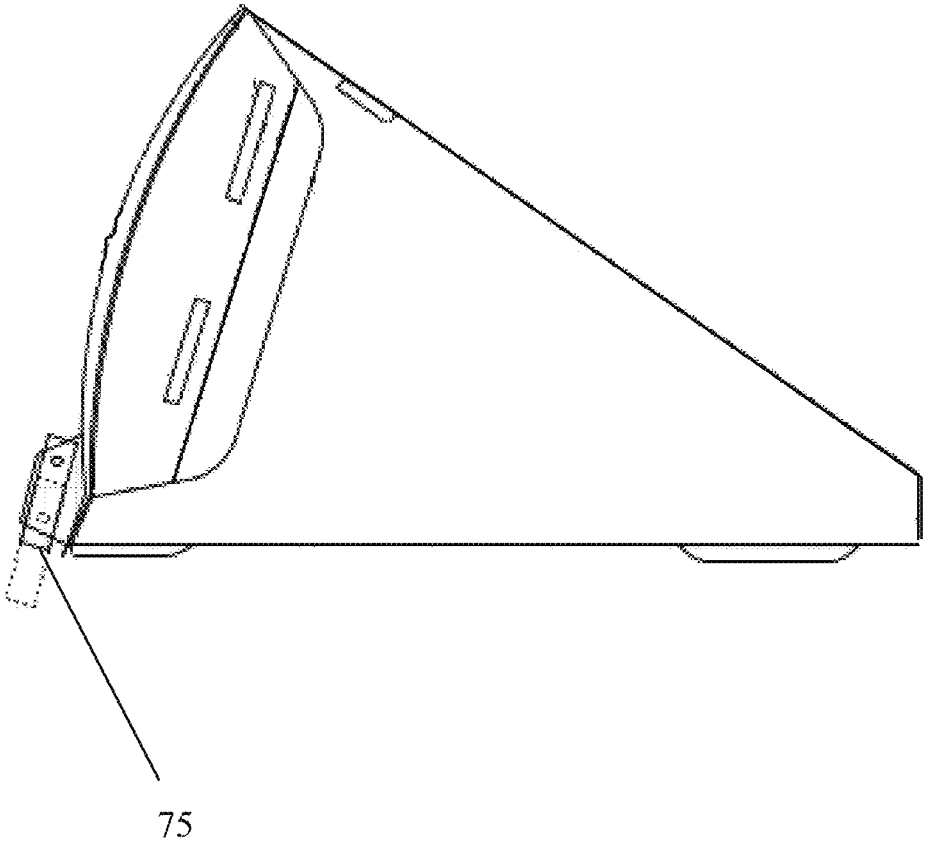
FIG. 17 is a side view of the applicator with an edge guide secured on the applicator.

In various implementations, the applicator includes attachments which enable the applicator to be used in specific locations, such as corners. In some implementations, the attachments are secured to the applicator by attaching to tabs 71 and 73 on the applicator. In some implementations, the applicator includes an edge guide 75 as seen in FIG. 17. The edge guide 75 fits over an edge, such as on an outside corner. An outside corner is where two walls meet and come to a point. The edge guide enables the applicator to be kept on the edge. This prevents drywall compound from spilling down the edge. In some implementations, the edge guide is rotatable. In some implementations, the edge guide rotates between an engaged position and a retracted position. In the engaged position, the edge guide runs along one edge of the corner, while the applicator glides along the other edge of the corner. In some implementations, the edge guide is permanently affixed to the lid. In some implementations, the edge guide is removable from the lid. In implementations where the edge guide is removable, the edge guide inserts and is removed from a hole in the lid. In some implementations, the corners are inside corners, where two walls meet and form a valley or a v. The applicator includes tabs 71 and 73 to which the attachments are secured. The corner applicator includes a corner scraper 67 and a corner diffuser 69. The corner diffuser 69 spreads the drywall compound out to the edges of the corner scraper 67. In some applications the attachments are further secured to the applicator with snap locks. In some implementations the attachment is in line with the front panel of the applicator as seen in FIG. 13. In some implementations, the attachments are positioned 90 degrees to the front panel as seen in FIG. 16.

The invention has been described with reference to various specific and preferred embodiments and techniques. Nevertheless, it is understood that many variations and modifications may be made while remaining within the spirit and scope of the invention.

What is claimed is:

1. An applicator for applying drywall compound comprising:

a front panel;

a first side panel;
a second side panel;
a back panel;
a lid;
a back bridge;
wherein the front panel, the first panel, the second panel, and the back panel are made from a single piece;
wherein the front panel, the first side panel, the second side panel, and the back panel are adapted to change configurations between a flat configuration and a box configuration;
wherein, when the front panel, the first side panel, the second side panel, and the back panel are in the box configuration, the lid secures the first side panel to the second side panel and the back bridge secures the first side panel to the second side panel;
wherein when the front panel, the first side panel, the second side panel, and the back panel are in the box configuration, the back panel articulates to change the volume of the box and push the compound out of the box, and wherein the back panel comprises a seal which prevents the compound from leaking past the back panel, as the compound is pushed out of the box;
wherein the lid includes a scraper, and wherein as the compound is pushed out of the box, the compound is directed by the lid out the front of the box, and the scraper distributes the compound on the drywall; and
wherein the back panel includes a shaft attachment hinge, and wherein the shaft attachment hinge limits the angle of the shaft relative to the back panel.

2. The applicator of claim 1, wherein the front panel, the first panel, the second panel, and the back panel are connected by living hinges.

3. The applicator of claim 1, wherein the back panel includes holes along the perimeter into which the seal is molded.

4. The applicator of claim 1, wherein the first side panel and the second side panel include lock shelves into which lock hooks on the lid fit.

5. The applicator of claim 1, wherein the first side panel and the second side panel include lock shelves into which lock hooks on the back bridge fit.

6. The applicator of claim 1, further comprising plunge stops on the back panel to prevent the back panel from collapsing into the front panel.

7. The applicator of claim 1, further comprising a structured recess in the back panel, which increases the stiffness of the back panel.

8. The applicator of claim 1, wherein the shaft attachment assembly limits the angle of the shaft to less than ninety degrees.

9. The applicator of claim 1, wherein the shaft attachment assembly limits the angle of the shaft to less than sixty degrees.

10. The applicator of claim 1, further comprising rear glides.

11. The applicator of claim 10, wherein the rear glides are positioned outside the compound application area, to allow multiple passes over an application area.

12. A method for applying drywall compound to a surface, the method comprising:
assembling an applicator for applying drywall compound comprising: a front panel, a first side panel, a second side panel, a back panel, a lid with a scraper, and a back bridge from a flat configuration to a box configuration, wherein the front panel, the first panel, the second panel, and the back panel are made from a single piece;
filling the box of the applicator with drywall compound;
positioning the applicator with the front panel parallel to the surface receiving the compound; and
pressing the rear panel so the drywall compound is pressed out the top of the box and spreading the drywall compound on the surface receiving the drywall compound with the scraper.

13. The method of claim 12, wherein the back panel comprises a seal which prevents the compound from leaking past the back panel, as the compound is pushed out of the box.

14. The method of claim 12, wherein the back panel includes a shaft attachment assembly, and wherein the shaft attachment assembly limits the angle of the shaft relative to the back panel.

15. The method of claim 12, wherein the front panel, the first panel, the second panel, and the back panel are connected by living hinges.

16. The method of claim 12, wherein the back panel includes holes along the perimeter into which the seal is molded.

17. The method of claim 12, wherein the first side panel and the second side panel include lock shelves into which lock hooks on the lid fit.

18. The method of claim 12, further comprising plunge stops on the back panel to prevent the back panel from collapsing into the front panel.

* * * * *